US006755597B2

(12) United States Patent
Bergner et al.

(10) Patent No.: US 6,755,597 B2
(45) Date of Patent: Jun. 29, 2004

(54) ELECTRIC TOOL COMPRISING A UNIVERSAL MOUNTING FOR TOOL ATTACHMENTS (75) Inventors: Joao Bergner, Aidlingen (DE); Uwe Engelfried, Ostfildern (DE); Martin Noack, Leinfelden (DE); Klaus Baumgartner, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/129,153

(22) PCT Filed: Sep. 7, 2001

(86) PCT No.: PCT/DE01/03448

§ 371 (c)(1),
(2), (4) Date: May 1, 2002

(87) PCT Pub. No.: WO02/26439

PCT Pub. Date:Apr. 4, 2002

(65) Prior Publication Data
US 2002/0187014 A1 Dec. 12, 2002

(30) Foreign Application Priority Data
Sep. 22, 2000 (DE) .......................................... 100 47 164

(51) Int. Cl.⁷ .............................. B23C 1/20; B23Q 9/00; B23Q 9/02

(52) U.S. Cl. ........................ 409/178; 409/182; 409/180; 409/126; 409/130; 409/218; 409/137; 144/136.95; 144/48.6; 30/122

(58) Field of Search ................................. 409/180, 178, 409/126, 125, 130, 182, 175, 218, 179, 137; 144/136.95, 154.5, 371, 144.52, 144.51, 48.6, 135.2; 451/358, 241, 282, 545, 438; 30/122

(56) References Cited
U.S. PATENT DOCUMENTS

| | | | | | |
|---|---|---|---|---|---|
| 1,899,883 A | * | 2/1933 | Sacrey | ................... | 144/136.95 |
| 2,541,306 A | * | 2/1951 | Taylor | ......................... | 408/111 |
| 3,259,021 A | * | 7/1966 | Appleton et al. | ........... | 409/124 |
| 3,450,001 A | * | 6/1969 | Fortune | ....................... | 409/130 |
| 3,476,161 A | * | 11/1969 | Dunlap | ........................ | 409/182 |
| 3,827,468 A | * | 8/1974 | Markham | ................. | 144/136.1 |
| 4,273,483 A | * | 6/1981 | Mendicino | .................. | 409/178 |
| 4,290,464 A | * | 9/1981 | Marsan | ................... | 144/136.95 |
| 4,406,568 A | * | 9/1983 | Rogers et al. | .............. | 409/182 |
| 4,552,192 A | * | 11/1985 | Eaves | ..................... | 144/136.95 |
| 4,572,715 A | * | 2/1986 | Wolff | ......................... | 409/180 |
| 4,674,548 A | * | 6/1987 | Mills et al. | ............... | 144/154.5 |
| 4,776,374 A | | 10/1988 | Charlebois | | |
| 5,005,617 A | * | 4/1991 | Michaels | .................. | 144/154.5 |
| 5,013,195 A | * | 5/1991 | Strazar | ....................... | 409/180 |
| 5,038,651 A | | 8/1991 | Burdick | | |
| 5,117,879 A | * | 6/1992 | Payne | .................... | 144/136.95 |

(List continued on next page.)

FOREIGN PATENT DOCUMENTS

DE 37 06 832 A 9/1988
WO WO-94/17944 A1 * 8/1994

OTHER PUBLICATIONS

Owner's Manual for the Craftsman All–In–One Cutting Tool Model No. 183.172521, Jun. 27, 2002, pp. 1–26.*

Primary Examiner—Erica Cadugan
(74) Attorney, Agent, or Firm—Michael J. Striker (57) ABSTRACT The invention relates to an electric power tool with a housing, in which a drive mechanism is received; the electric power tool includes a shaft, with a chuck (20) received in it, for receiving a tool insert (19). The chuck (20) is surrounded by an annular bearing face (9). The bearing face (8, 9) includes receiving elements that enable the guidance of the electric power tool on a guide rail (1, 35), such as receptacles (21, 22; 31, 32) and (33) for slip-on tools (25), such as templates, that can be received on the support (8, 9).

10 Claims, 7 Drawing Sheets

U.S. PATENT DOCUMENTS

| | | | | |
|---|---|---|---|---|
| 5,293,915 A | * | 3/1994 | Fuchs et al. | 144/154.5 |
| 5,662,440 A | * | 9/1997 | Kikuchi et al. | 409/182 |
| 5,829,931 A | * | 11/1998 | Doumani | 409/182 |
| 5,833,409 A | * | 11/1998 | Giacometti et al. | 409/182 |
| 5,983,968 A | * | 11/1999 | Newman | 144/144.51 |
| 6,244,796 B1 | * | 6/2001 | Schuebel et al. | 409/180 |
| 6,382,890 B1 | * | 5/2002 | Linderholm | 409/191 |
| 6,443,676 B1 | * | 9/2002 | Kopras | 409/182 |
| 6,622,762 B2 | * | 9/2003 | Bergner et al. | 144/136.95 |
| 2002/0168241 A1 | * | 11/2002 | David et al. | 409/178 |
| 2003/0044252 A1 | * | 3/2003 | Landt | 409/182 |
| 2003/0206779 A1 | * | 11/2003 | Kopras et al. | 409/182 |
| 2003/0223836 A1 | * | 12/2003 | Pozgay et al. | 409/182 |
| 2003/0228200 A1 | * | 12/2003 | Talesky et al. | 409/179 |

* cited by examiner

ELECTRIC TOOL COMPRISING A UNIVERSAL MOUNTING FOR TOOL ATTACHMENTS

BACKGROUND OF THE INVENTION

Electric power tools both for do-it-yourselfers and for craftsmen must be suitable for many different purposes, if they are to find enough customers. For the most various purposes of the electric power tool, retrofitting of the electric power tool may be needed from one intended use to another, and as much as possible such retrofitting should be feasible without an additional tool. Besides retrofitting that can be done quickly and simply on the tool and is preferably feasible via snap closures or bayonet mounts, there is a need on an electric power tool to be able to move the electric power tool along a guide as well, to enhance the quality of the work done, such as the course of a cut or the location of a milled opening.

Copying sleeves used until now, which can be used as slip-on tools on electric power tools, require a complicated receptacle on the bearing foot of the tool. If the slip-on tool for instance is copying sleeves, then when used in interior completion or renovation, they have to be changed often—for instance whenever single or multiple electrical outlets have to be installed in room walls or bearing building walls. The frequent change of vertical collar openings to be placed at different diameters in interior completion or renovation is time-consuming and tedious. A complicated receptacle demands additional time and when done often on the electric power tool is a weak point of the tool, which makes such an electric power tool combination more vulnerable to malfunction.

Electric power tools used in interior completion or renovation should, however, be sturdy in design and should have copying sleeve receptacles that are easy to change by simply being slipped onto the electric power tool.

SUMMARY OF THE INVENTION

The advantages associated with the embodiment of the invention are considered above all to be that the electric power tool can now be guided along a guide rail on a guide groove shaped out in the support foot or in the bearing face thereof on the workpiece.

The closing edge of the guide rail can function as a reference edge for longitudinal guidance of the tool or can serve to position the electric power tool, with a tool insert received in it, relative to the workpiece. To make longitudinal guidance along the guide rail easier, the groove provided in the support, represented for instance by two aligned notches on the circumference, can be let by positive engagement into a guide rib embodied on a guide rail, so that lateral displacement of the electric power tool along with the insert tool received on it is possible along the guide rib. The guide rail can be embodied as a universally usable tool with an integrated template function, by the provision of different templates of different diameters. With it, workpieces can be cut or milled flush, the workpieces comprising the most various materials, such as plaster, wood, wood materials, whether they invoke solid wood or particle boards or the like. The closing edge of the guide rail provided with a guide rib can advantageously serve as a reference edge. On the other hand, by means of a guide rail with an integrated template function, this can for instance serve as a milling template for vertical collar fittings to be provided in room walls or in bearing building walls. The usual mill opening diameters for vertical collar diameters can be provided on the template. Milling can now be done in a straight line along the guide rib of the guide rail by simply mounting the support of the electric power tool.

On the support foot of the tool configured according to the invention, a copying sleeve can be received in a simple way on detent means or encircling grooves provided there, which act as a receiving element for a slip-on-type tool attachment. The tool attachments that can be slipped on and locked on the bearing face in the manner of a bayonet mount can be rotated in the manner of a bayonet mount, after a slip-on motion done in the vertical direction, by a few degrees in the circumferential direction of the electric power tool and are reliably fixed directly in their working position.

The copying sleeves serving as slip-on tools are slip-on-type elements; they are preferably made from plastic, and on their circumference, in the region of a drive mechanism extending all the way around and beginning at the bottom face, they are provided with a number of detent tongues. The flexibility of the detent tongues on the drive mechanism of the slip-on tool can be enhanced by providing that the various detent tongues provided on the drive mechanism are surrounded on both sides by openings, so that the detent tongues per se, as plastic components, intrinsically have a certain amount of elasticity, which reinforces a snap-in motion. The detent tongues can for instance be oriented at an angle of 90° from one another on the template-like top-mounted element, so that the slip-on element is fixed at four points along the circumference of the bearing face. The bottom region of the template-like slip-on element made from plastic can be adjusted variously, depending on the desired machining depth of the insert tool received in the chuck of the electric power tool. By way of the configuration of the bottom region, that is, the thickness of the bottom region of the template, the machining depth can be adjusted by the insert tool on the one hand; on the other hand, advantageously, a vertical adjuster is received on the side of the electric power tool. The vertical adjuster includes an attachment element, on which, with an opening, the annular support surrounding the tool receptacle is embodied.

On the vertical guide, a screw is provided, extending in a longitudinal groove and fixable with stool or via a capstan screw; the vertical guide is embodied as a groovelike profile. Thus the spacing of the electric power tool, or of the insert tool received in it, from the bearing face of the support can be adjusted, so that with the vertical adjuster, the machining depth by the tool insert is also adjustable.

BRIEF DESCRIPTION OF THE DRAWING

The invention will be described in further detail below in conjunction with the drawing.

Shown are.

DESCRIPTION OF THE PREFERRED EMBODIMENTS

Figure 1:
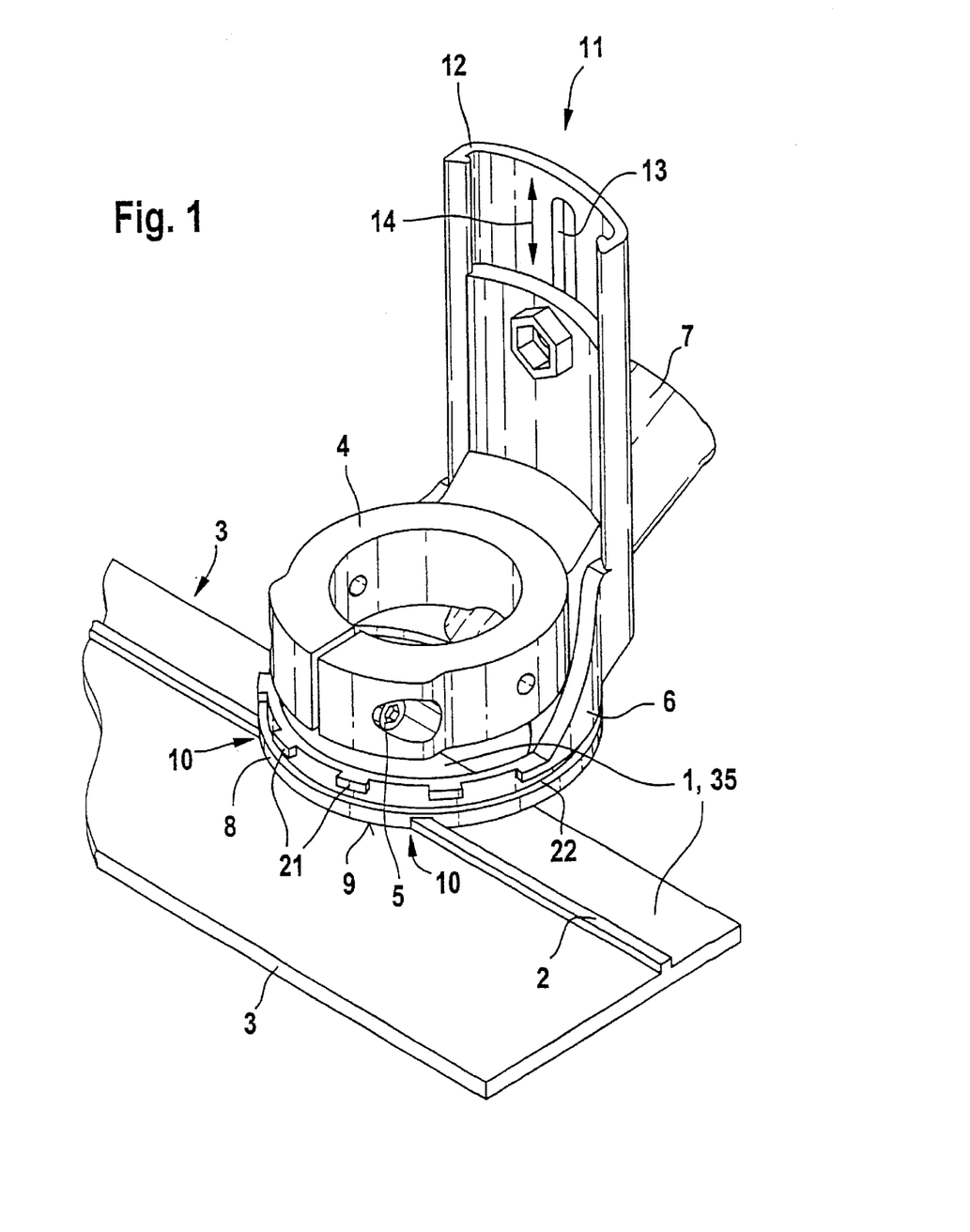
FIG. 1, a perspective view of a clamping ring, embodied on the electric power tool, that is adjustable vertically in a profile, and the bearing face of the electric power tool is seated on the guide rib of a guide rail.

From FIG. 1, a perspective view of a bearing face mounted on a guide rail with a guide rib can be seen, which is received on an extension in which a clamping ring that receives the electric power tool is displaceable vertically.

The guide rail identified by reference numerals 1, 35 is provided with a guide rib 2 extending parallel to the length of the guide rail 1, 35. The guide rib 2 is raised above the surface of the guide rail 1, 35. The guide rail 1, 35 is bounded on both sides by edges 3. The electric power tool, not shown in the perspective view of FIG. 1, is surrounded by a seat face 18 of the clamping ring 4, and the prestressing in the clamping ring 4 is generated by a clamping screw 5. The clamping ring 4 is displaceable in a guide profile 12 in the vertical direction indicated by the double arrow 14, and the relative position between the continuation of the clamping ring 4 and the guide profile 12 can be defined by means of a longitudinal groove 13 and an actuatable capstan screw that penetrates the continuation of the clamping ring 4. The profile 12 gripping around the continuation of the clamping ring 4 on both sides, serves as a vertical guide, on which laterally inclined in the chip discharge chute 7 is disposed.

The support 8, 9, configured according to the invention, which is seated with its bearing face 9 on the plane side of the guide rail 1, is provided, in the region of the guide rib 2, with opposed notches 10 on the bearing face 9. By means of the notches 10 in the annularly configured bearing face 9 of the support 8, a longitudinal groove is formed, which allows a displacement of the support 8 along the guide rib 2 of the guide rail 1, 35, this rail being shown schematically here.

Also embodied on the outer circumference of the support 8, 9 are detent lugs 21, between which and the bearing face 9 an encircling groove 22 may be provided.

It can be seen from FIG. 1 that in this variant of the embodiment proposed according to the invention, the support 8, 9 is displaceable rectilinearly, without the interposition of a top-mounted element, directly along a guide rail 1, along the guide groove 2 configured there.

Figure 2:
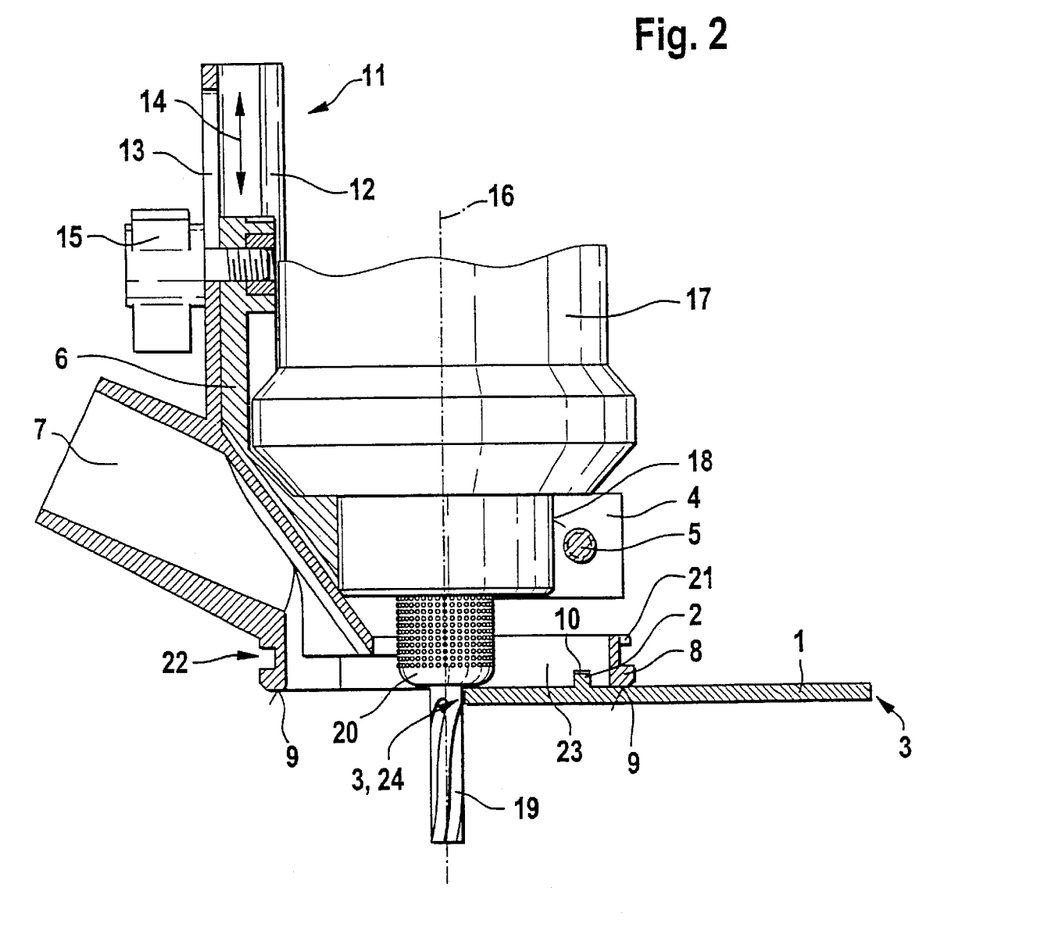
FIG. 2, a cross section through the configuration shown in FIG. 1.

In the view of FIG. 2, a section through the arrangement of FIG. 1 is seen in more detail. In the upper region of FIG. 2, the vertical guide of the electric power tool 11, which represents a vertical motion of the continuation of the clamping ring 4, which ring is surrounded by a guide profile 12 interrupted by a longitudinal groove 13. A capstan screw 15 that can be controlled from outside is provided on the guide profile 12; it is secured to the continuation and penetrates the longitudinal groove 13, and with it, the relative position of the continuation of the clamping ring 4 and the guide profile 12 to one another can be defined. Then the electric power tool 17, received on the extension 6, is fixed vertically relative to the annularly configured support 8 or 9 provided on the guide profile 12.

In the lower region of FIG. 2, the guide rail 1, 35 is shown in cross section; a guide rib 2 extending perpendicular to the plane of the drawing is embodied on it. In the view of FIG. 2, the guide rib 2 is surrounded by groovelike recesses in the support region 9 of the support 8, so that an exact guidance of the circumference of the tool insert 19, received in the chuck 20, relative to the edge 3, 24 of the guide rail ensues. As a result, an exact guidance of the electric power tool 17 with the tool insert 19 received on it is possible along the guide rail 1 as a result of positive engagement between the slip-on tools 10 and the guide rib 2.

It should also be noted that an extension stub that makes it possible to vacuum out chips is embodied on the extension 6, extending at an incline to the axis of symmetry 16 of the electric power tool 7.

Figure 3:
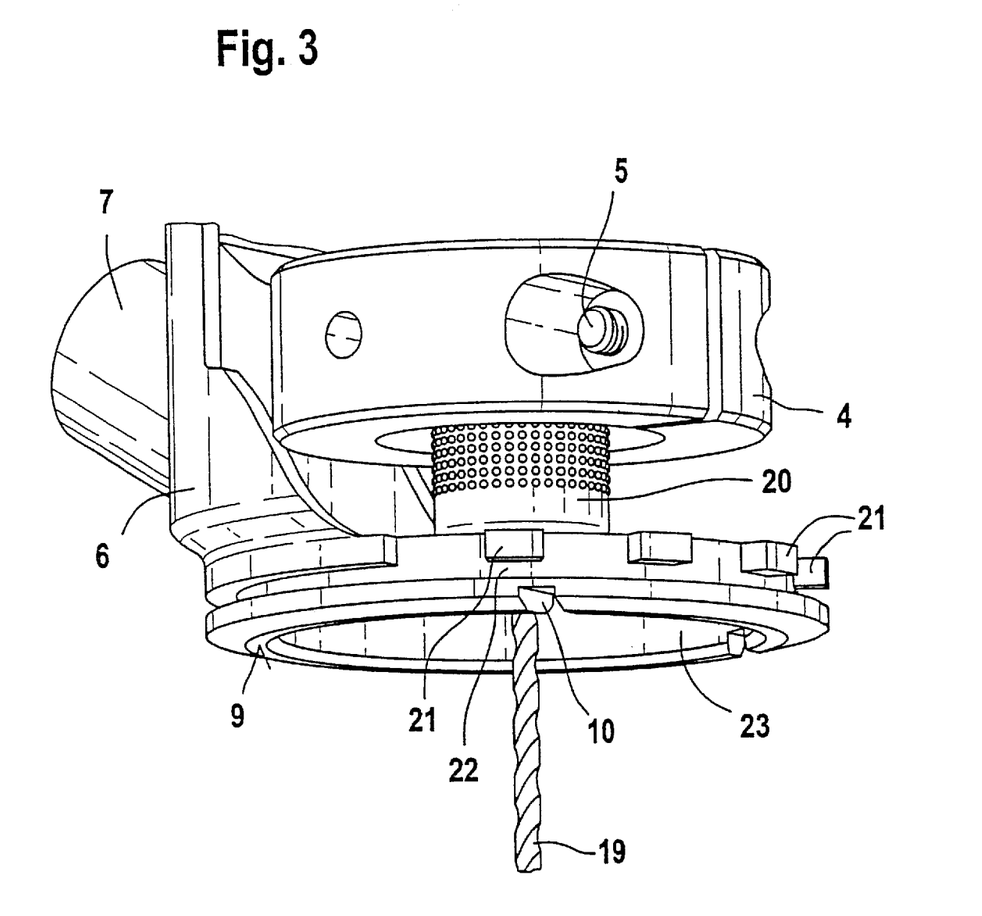
FIG. 3, an insert tool, received in the chuck of the electric power tool and surrounded by the annularly configured support.

FIG. 3 provides a perspective plan view on the lower region of the electric power tool 17 in greater detail. Reference numeral 4 designates the clamping ring, surrounding the seat face 18 of the electric power tool 17, with which ring a radial tension is attainable by tightening the capstan screw 5. Laterally on the support 8 or on the annularly configured bearing face 9, an extension 6 is shown, which tapers toward the top to form a guide profile, laterally on which the chip discharge chute 7 can be embodied, analogously to what is shown in FIG. 2.

Below the clamping ring 4 surrounding the bearing face 18 of the electric power tool 17, there is a chuck 20 with a rough surface, making it easier to manipulate by hand for the sake of opening and closing. In the view of FIG. 3, an insert tool 19 in the form of a milling cutter is received in the chuck 20 of the electric power tool 17.

The support 8 or the bearing face 9 includes a plurality of detent lugs 21, disposed side by side in the circumferential direction, and an encircling groove 22 may be embodied between the detent lugs 21 and the bearing face 9 on the support 8.

Figure 4:
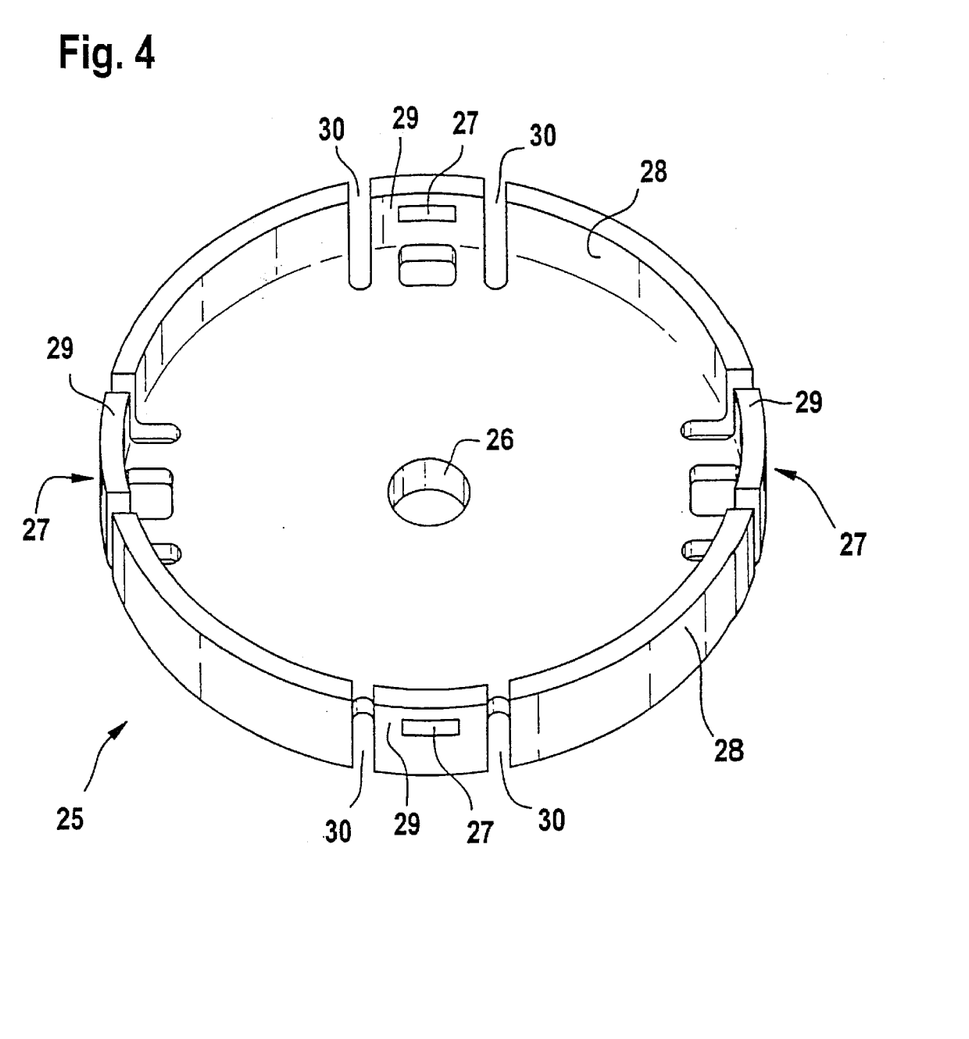
FIG. 4, a template-like slip-on element, preferably made from plastic, for the support of the electric power tool.

From the view in FIG. 4, a slip-on template element, preferably made from plastic, is seen in greater detail.

The template guide element 25 is penetrated centrally by an opening 26, which can certainly have some other diameter than what is shown in FIG. 4. The view in FIG. 4 shows that a drive mechanism 28 adjoins the bottom region of the template guide-like slip-on element 25. The drive mechanism 28 is offset from the bottom region by 90°. Over a 360° extent of the drive mechanism 28, four detent tongues 29 are embodied on it, offset from one another by 90° each. Each of the detent tongues 29 is separated from the remaining drive mechanism material by a respective opening 30. As a result, the detent tongues 29 intrinsically have a greater amount of elasticity or flexibility, compared to the remaining sections of the drive mechanism 28 of the template guide-like slip-on element 25. At the individual detent tongues 29, openings 27 may for instance be provided, but pinlike protrusions can certainly also be embodied at the detent tongues 29. Instead of the four detent tongues 29, offset from one another by 90°, that are embodied on the template-like slip-on element as shown in FIG. 4, it is certainly possible to provide only three detent tongues, offset by 120°, or to provide more than four detent tongues 29.

Figure 5:
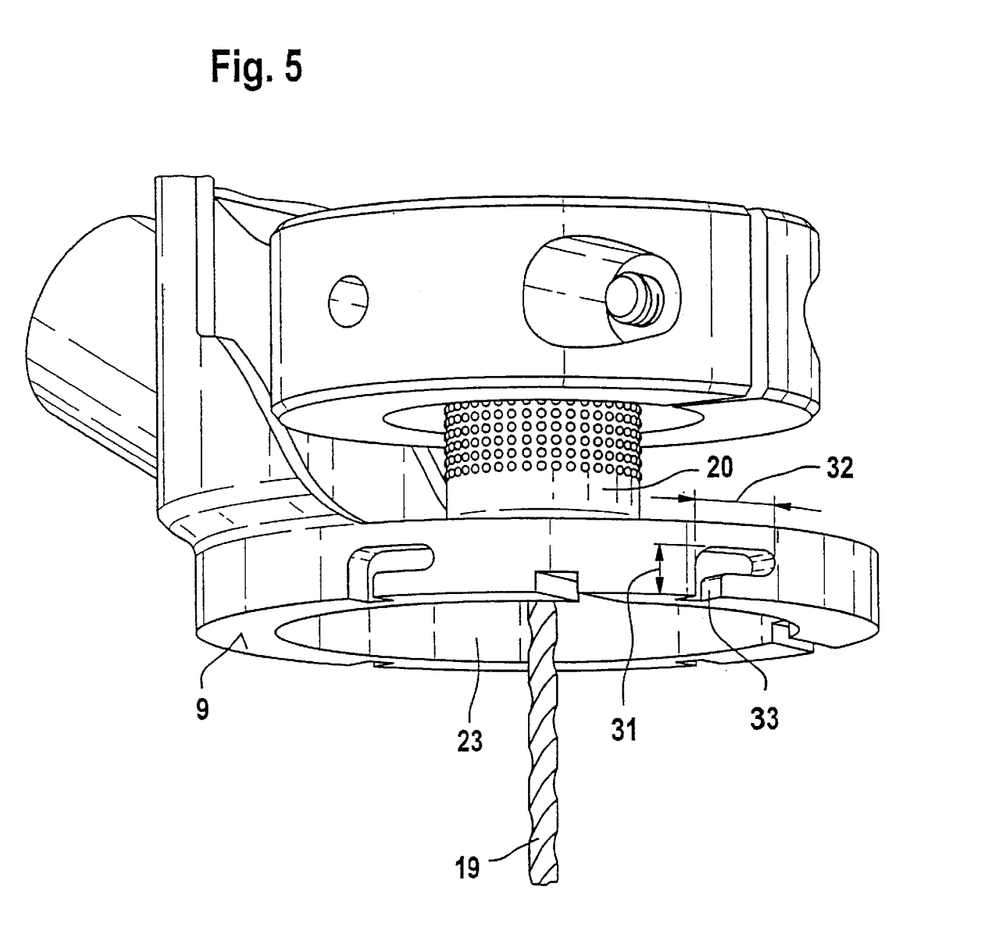
FIG. 5, a schematically shown opening, provided in the bearing face of the electric power tool and making a bayonet mount possible.

FIG. 5 shows the nature of a bearing face 9 on an electric power tool 17 in more detail; openings that receive a bayonet mount are provided in the bearing face 9.

In the annular support 9 surrounding the tool insert 19, on the on the support 8 on its circumference, there are a plurality of dashlike recesses, making a bayonet mount possible. These recesses have openings 33, parallel to the slip-on direction of the insert tool 19, which extend in the direction of the arrow 31 in the slip-on direction of the slip-on element. The openings 33 extending in the slip-on direction 31 change over to a bayonet mount opening 32 extending 90° from them. By means of the thus-configured openings in the support 8 of the electric power tool 17, slip-on elements in accordance with FIG. 4, or copying sleeves configured in some other way, or the like can easily be secured with only a few hand motions to the support 8 or 9 of the electric power tool, without requiring the use of a wrench or some other tool.

Figure 6A:
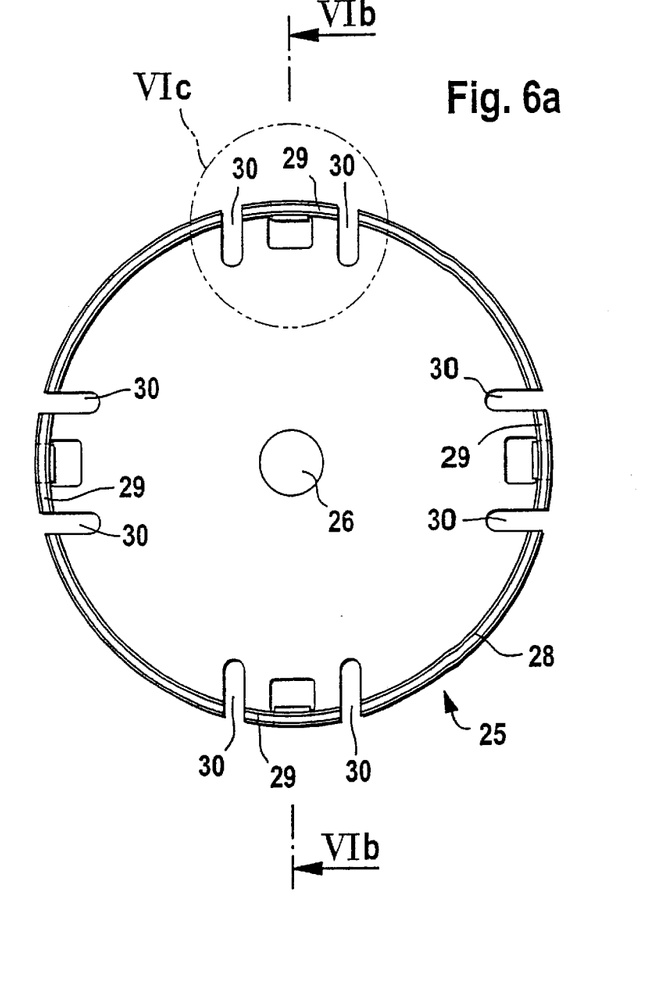
FIGS. 6a, b and c, a view of a template-like slip-on element, made from plastic, with a central bore and with four resilient detent tongues provided on the circumferential surfaces (compare the view in FIG. 4)
Figure 6B:
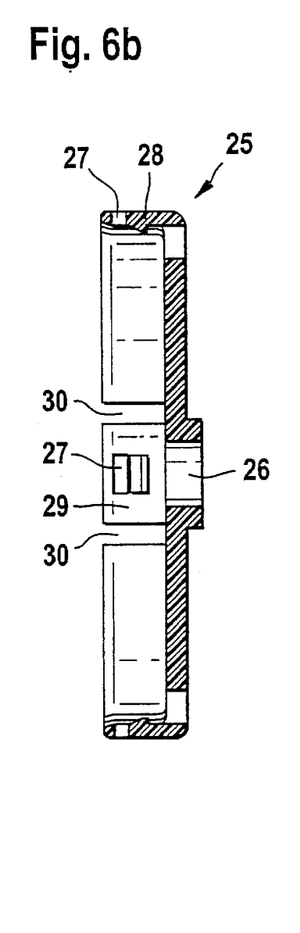
Figure 6C:
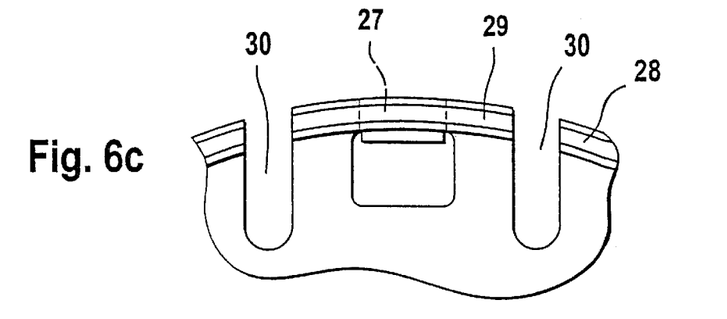

The configuration of the slip-on tool 25 is seen on a larger scale in greater detail in the view in FIG. 6.

Analogously to the view shown in perspective in FIG. 4 of the template guide-like slip-on element 25, this tool is provided with for instance four detent tongues 29 along its circumference. By means of recesses 30 embodied in the drive mechanism 28, the detent tongues 29 intrinsically have a great deal of flexibility, so that by means of a successive slip-on motion, they can be fixed in their respective position on the bearing face 9 of the on the electric power tool 17 on the support 8 by means of an only minimal rotary motion. In the middle of the bottom region of the template-like slip-on element, a central bore 26 is provided, which instead of the size shown in FIG. 6 may also be configured with a substantially greater diameter. The template guide-like slip-on elements 25 shown in FIG. 6 in plan view, side view and a detail, are as a rule manufactured in template sets and can be used in versatile ways, depending on the required diameter 26, for instance for making openings for vertical collars in interior completion or renovation.

In the upper region of the view in FIGS. 6*a, b, c*, a detent tongue 29 is shown enlarged; it is bounded on both sides by openings 30, which intrinsically lend the detent tongue 29 a greater elasticity, so that easier snapping onto the support, that is, into the encircling groove 22, is made possible.

The cross section through the template guide-like slip-on element 25 shows that the opening 26 ends in a collar on the bottom region of the template guide-like slip-on element 25, which collar is pierced in the axial direction by the tool insert, received on the chuck 20 of the electric power tool 17 as the template guide-like slip-on element 25 is slipped onto the support 8 or 9 of the electric power tool 17. From the cross-sectional view of FIG. 6, it can be seen that the detent tongues (29) include protrusions, in the region of the weakened drive mechanism 28, with which protrusions the template guide-like slip-on element 25 can be secured to the encircling groove 22 of the support 8, or with the interruptions 27 provided in the region of the detent tongues, to the detent lugs 21 on the outer circumference of the support 8, entirely on the order of a bayonet mount, as shown in FIG. 5.

Figure 7:
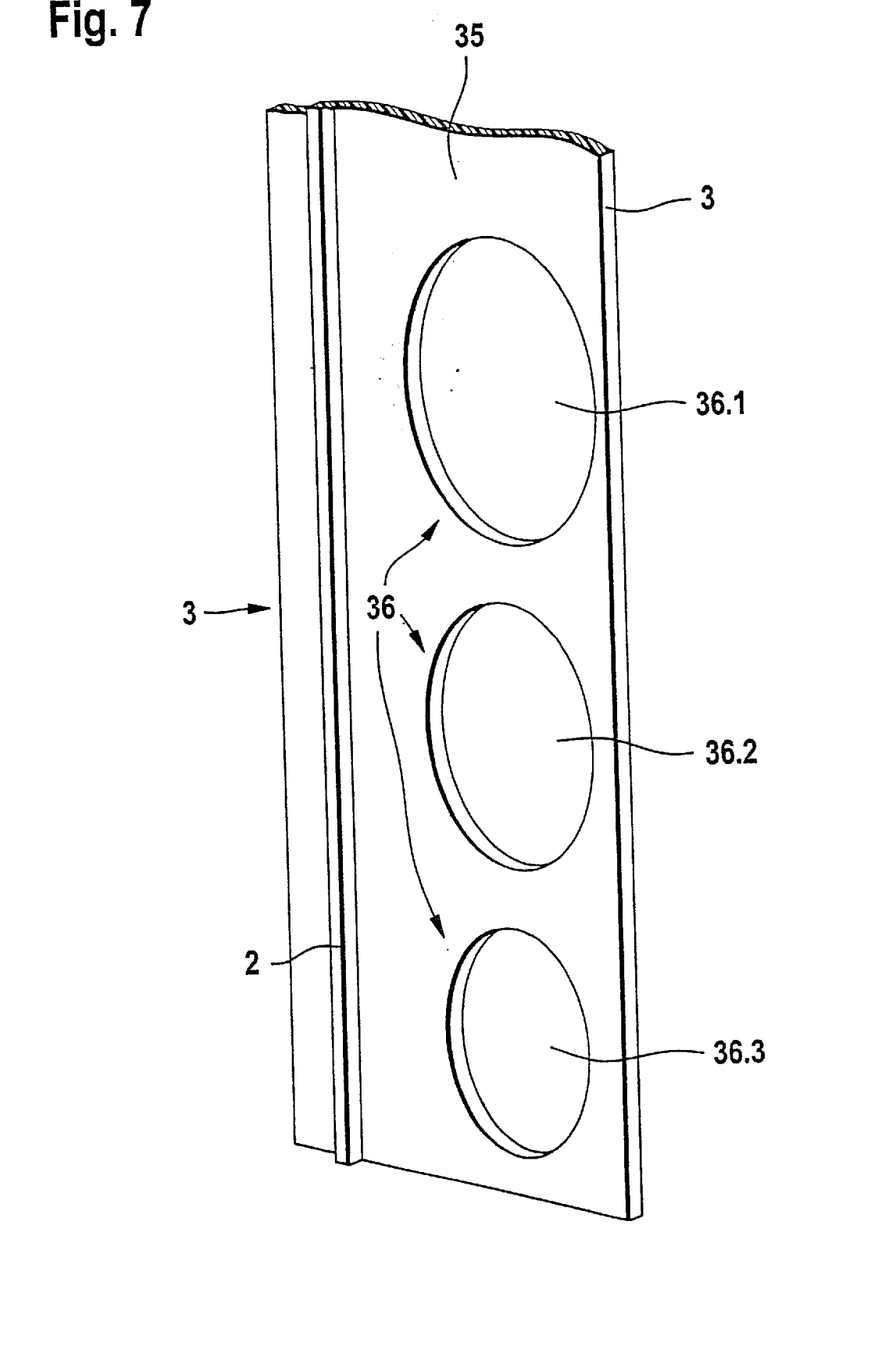
FIG. 7, a guide rail with an integrated template function, in which the various templates can be embodied with the usual standard diameters for vertical collars.

From the view in FIG. 7, the configuration of a guide rail 35 can be seen, along which a guide rib 2 extends parallel to the length of the guide rail 35. The guide rib 2 extends parallel to the lateral edges 3 of the guide rail 35. In the guide rail 35, besides the guide rib element 2 that protrudes in raised fashion in the edge region 3 and allows guidance of the electric power tool 17 along the edge region 3 to generate a precise cut or a precise edge, openings of different diameters are provided. The openings of different diameter, designated by reference numerals 36.1, 36.2 and 36.3, act as templates 36 for performing milling cuts, for instance for installing vertical collars in room walls in interior completion or renovation. The milling tool 19, protruding past the bearing face 8 or 9 and received in the chuck 20 driven by the electric power tool 17, can be moved along the circular opening 36.1, 36.2 and 36.3, so that an exact milling cut can be made in one of the templates 36.1, 36.2 and 36.3 of different diameter. Advantageously, the diameters of the individual templates 36.1, 36.2 and 36.3 on the guide rail 35 are selected such that these diameters correspond to diameters of standard sizes of vertical collars for interior completion or renovation.

| List of Reference Numerals | |
|---|---|
| 1 | Guide rail |
| 2 | Guide rib |
| 3 | Edge |
| 4 | Clamping ring |
| 5 | Clamping screw |
| 6 | Extension |
| 7 | Chip discharge chute |
| 8 | Support |
| 9 | Bearing face |
| 10 | Guide groove |
| 11 | Vertical adjuster of electric power tool |
| 12 | Guide profile |
| 13 | Longitudinal groove |
| 14 | Adjustment course |
| 15 | Capstan screw |
| 16 | Segment axis |
| 17 | Electric power tool |
| 18 | Seat face |
| 19 | Tool insert |
| 20 | Chuck |
| 21 | Detent lug |
| 22 | Encircling groove |
| 23 | Circular opening |
| 24 | Edge guide |
| 25 | Slip-on tool (template) |
| 26 | Opening |
| 27 | Detent opening |
| 28 | Drive mechanism |
| 29 | Detent tongue |
| 30 | Recess |
| 31 | Slip-on length |
| 32 | Bayonet mount |
| 33 | Opening |
| 34 | Recess |
| 35 | Guide rail with template and rib |
| 36 | Template |
| 36.1 | First template diameter |
| 36.2 | Second template diameter |
| 36.3 | Third template diameter |

What is claimed is:

1. An electric power tool having a power unit received in a housing, wherein said electric power tool includes a shaft with a chuck received on said electric power tool for receiving an insert tool, and the chuck is surrounded by an annular support having a bearing face provided with recesses which enable a movement of said electric power tool along a guide rib, and said annular support including receptacles for interchangeable slip-on tools.

2. The electric power tool of claim 1, wherein the receptacles are configured as formations selected from the group consisting of detent protrusions and an encircling groove.

3. The electric power tool of claim 1, wherein the receptacles are embodied as a bayonet mount on said annular support.

4. The electric power tool of claim 1, wherein in said interchangeable slip-on tools are template guides which are slippable on and locked in detent fashion in said receptacles on said bearing face.

5. The electric power tool of claim 4, wherein said template guides are formed as plastic parts with a central opening and are provided on a circumference of said template guides with at least one detent tongue.

6. The electric power tool of claim 4, wherein each said template guide has a vertical collar with detent tongues defined by recesses on both sides.

7. The electric power tool of claim 4, wherein each said template guide has a bottom provided with a protrusion that allows said electric power tool to be guided along a guide.

8. The electric power of claim 4, wherein said insert tool received in said chuck of said electric power tool has a working depth which is variable by means of a thickness of a bottom region of said template guides that are lockable in detent fashion to said annular support.

9. The electric power tool of claim 1; and further comprising a guide rail provided with said guide rib and including machining templates of different diameters.

10. The electric power tool of claim 1, wherein said annular support is mounted on a vertically adjustable extension and is adjustable in height relative to said insert tool.

* * * * *